(12) United States Patent
Chan et al.

(10) Patent No.: US 9,375,670 B2
(45) Date of Patent: Jun. 28, 2016

(54) AIR PURIFICATION SYSTEM

(71) Applicant: Akos Advanced Technology Ltd., Shatin, N.T. (HK)

(72) Inventors: Yiu Wai Chan, Tin Shui Wai (HK); Sui Chun Law, Shatin (HK)

(73) Assignee: Akos Advanced Technology Ltd., Shatin (HK)

( * ) Notice: Subject to any disclaimer, the term of this patent is extended or adjusted under 35 U.S.C. 154(b) by 0 days.

(21) Appl. No.: 14/322,439

(22) Filed: Jul. 2, 2014

(65) Prior Publication Data

US 2014/0311339 A1    Oct. 23, 2014

Related U.S. Application Data

(63) Continuation of application No. 12/340,087, filed on Dec. 19, 2008, now Pat. No. 8,778,272.

(30) Foreign Application Priority Data

Dec. 21, 2007  (EP) .................................... 07123923

(51) Int. Cl.
| | |
|---|---|
| *B01D 46/44* | (2006.01) |
| *F24F 3/16* | (2006.01) |
| *B01D 46/00* | (2006.01) |
| *F24F 11/00* | (2006.01) |
| *F24F 1/00* | (2011.01) |

(52) U.S. Cl.
CPC .......... *B01D 46/442* (2013.01); *B01D 46/0023* (2013.01); *B01D 46/0036* (2013.01); *F24F 3/1603* (2013.01); *F24F 3/166* (2013.01);
(Continued)

(58) Field of Classification Search
CPC ...... B01D 46/23; B01D 46/36; B01D 46/442; F24F 3/166; F24F 3/1603; F24F 11/17; F24F 11/79; F24F 2001/96; F24F 2003/1667; Y02B 30/78; Y02B 30/746
See application file for complete search history.

(56) References Cited

U.S. PATENT DOCUMENTS

| | | | |
|---|---|---|---|
| 7,063,820 B2 | 6/2006 | Goswami | |
| 7,201,787 B2 | 4/2007 | Choi | |

(Continued)

FOREIGN PATENT DOCUMENTS

| | | |
|---|---|---|
| DE | 4427793 A1 | 2/1996 |
| DE | 10126475 A1 | 3/2003 |

(Continued)

*Primary Examiner* — Kishor Mayekar
(74) *Attorney, Agent, or Firm* — KPPB LLP

(57) ABSTRACT

An air purification system including a Particle Phase Pollutant (PPP) treatment section (9) having an air inlet (14) and an air outlet (15), a particle removal filter, (11) and a blower (12) to draw air from the air inlet (14) of the PPP treatment section (9) to pass through the particle removal filter (11) and exit through the air outlet (15) of the PPP treatment section (9). The system also includes a Gas Phase Pollutant (GPP) treatment section (10) installed at a downstream position of the particle removal filter (11) of the PPP treatment section (9), the GPP treatment section (10) having an air inlet (19) and an air outlet (20), a gas removal filter (16) with high filter air flow resistance, and a blower (17) located at a downstream position of the gas removal filter (16) to draw air from the air inlet (19) of the GPP treatment section (10) to pass through the gas removal filter (16) and exit through the air outlet (20) of the GPP treatment section (10). In addition, airflows of the GPP treatment section (10) and PPP treatment section (9) are directed by their respective blower (12, 17), and a portion of the air exiting the air outlet (15) of the PPP treatment section (9) is directed through the air inlet (19) of the GPP treatment section (10).

7 Claims, 13 Drawing Sheets

(52) U.S. Cl.
CPC ......... *F24F11/0079* (2013.01); *F24F 11/0017* (2013.01); *F24F 2001/0096* (2013.01); *F24F 2003/1667* (2013.01); *Y02B 30/746* (2013.01); *Y02B 30/78* (2013.01)

(56) References Cited

U.S. PATENT DOCUMENTS 8,778,272 B2   7/2014   Chan et al.

2006/0078480 A1    4/2006   Spry
2007/0012181 A1*   1/2007   Niezgoda et al. .................. 95/1

FOREIGN PATENT DOCUMENTS

| EP | 0533078 A3 | 9/1992 |
| JP | 2004074859 | 3/2004 |
| WO | 2004100748 A1 | 11/2004 |
| WO | 2007055430 A1 | 5/2007 |

* cited by examiner

AIR PURIFICATION SYSTEM

RELATED APPLICATIONS

This application is a continuation application of U.S. application Ser. No. 12/340087 filed Dec. 19, 2008, which claimed priority to European patent application number EP07123923.0 filed Dec. 21, 2007.

TECHNICAL FIELD

The invention concerns an air purification system.

BACKGROUND OF THE INVENTION

Indoor pollutants are generally classified into two categories based on their physical size and properties: gas phase pollutants and particle phase pollutants. Gas phase pollutants are chemical molecules or vapors which are in molecular size. Particle phase pollutants are particulate matter or bacteria which are in a few to hundred micron size.

Traditionally, air purification involves the use of a HEPA, an ionizer, and/or an electrostatic precipitator for the removal of particulate matter and airborne bacteria.

To further reduce the gas phase pollutants, adsorbent materials such as activated carbons and molecular sieves can be employed. These gas removal filters can be collectively grouped as adsorption filters. Adsorption filters are usually characteristic with high filter air flow resistance when closely packed. In some cases, a photocatalyst filter together with a UV source for volatile organic compounds decomposition are employed. Gas removal filters utilizing a method involving a decomposition reaction that occurs on the catalyst surfaces can be collectively grouped as catalyst filter. A characteristic of some catalyst filters is low filter air flow resistance.

In a conventional air purification system, a blower is used to draw or blow the air from the upstream to the downstream. Generally, the air is brought to pass through the first few layers for particulate matter and airborne bacteria removal and subsequently the layers in the downstream position for gas phase pollutants removal.

This layer by layer design enables the gas phase pollutants to be removed effectively only at the early stage. As no particle filter would be able to remove the particulate matter completely; the un-removed particulate matter would fall into the second, third, fourth layers and so on. Over time, the gas removal adsorption filters become ineffective in the later stages because they become saturated and due to clogging on the adsorption surface by the buildup of particulate matter. If a catalyst filter is used, it can fail to properly function and is unable to decompose the gas phase pollutant molecules. This is because the buildup of particulate matter from upstream layers contaminates the surface of the catalyst and prevents it from adsorbing reactant for reaction. Therefore, the catalytic surface becomes poisonous and ineffective.

The traditional design of removing particulate matter and gas phase pollutants by a single blower also creates a fundamental problem. The high air flow rate is beneficial only for the particulate matter removal. A high airflow rate increases the number of times for particulates to pass through the particle filter and hence the number of particulates being caught is increased. Nevertheless, the high air flow rate is unfavorable for gas phase removal. This is because the adsorption and absorption of gas phase pollutants in adsorption filter or adhesion of pollutants on surface of catalyst filter for chemical decomposition requires time. They work best only in slow air flow rate, which would lengthen the residence time. In other words, there exists a contradiction on the "optimum need of airflow rate" for particulate matter removal and gas phase pollutants removal.

As a result, traditional air purification techniques which target particulate matter and gas phase pollutant removal, requires the use of layers by layers and including a single blower. This leads to problems that: shorten the lifetime of the gas removal filters and the effectiveness of the particle removal filter and also the gas removal filter is difficult to optimize at the same time.

To address the above problem, Japanese patent application 2004-74859 has a special design using a damper for switching the air flow path and branches the downstream into either an ion generation electrode path or into a filter based on the concentration of dust in the environment. If a catalytic filter is used in place of the downstream opening 9b, the design preserves the life catalytic filter. This is because the damper closes the catalyst filter and allows only dust removal. When the dust level concentration is low, the damper closes the dust removal filter and opens the catalyst filter. However, the design is inflexible and unable to treat air properly if the environment is polluted with both high concentrations of gas phase and particle phase pollutants. Moreover, in the design, a blower is installed at the upstream position. The air is blown onto a filter instead of drawn into a filter. The filter with high filter air flow resistance is undesirable because air would return back instead of passing through the filter smoothly when the air is blown onto it.

Referring to FIG. 1, a prior art air purification system is shown. In the prior art air purification system, a blower 1 is used to draw or blow air 6 from an upstream position to a downstream position. Generally, air passes through the first few layers 2-3 for particulate matter and airborne bacteria removal and subsequently the layers 4-5 in the downstream position for gas phase pollutant removal.

Referring to FIG. 2, a modified prior art air purification system is shown according to the principle disclosed in Japanese patent application 2004-74859. Japanese patent application 2004-74859 has a special design which includes a damper 7 for switching air flow path and branches the downstream path into either an ion generation electrode path or into a filter path based on the concentration of dust in the environment. A catalytic filter 8 is used in place of the one down stream opening and a dust removal filter is used in place of the "filter"

SUMMARY OF THE INVENTION

In a first aspect, there is provided an air purification system including a Particle Phase Pollutants (PPP) treatment section having an air inlet and an air outlet, a particle removal filter, and a blower to draw air from the air inlet of the PPP treatment section to pass through the particle removal filter and exit through the air outlet of the PPP treatment section, a Gas Phase Pollutants (GPP) treatment section installed at a downstream position of the particle removal filter of the PPP treatment section, the GPP treatment section having an air inlet and an air outlet, a gas removal filter with high filter air flow resistance, and a blower located at a downstream position of the gas removal filter to draw air from the air inlet of the GPP treatment section to pass through the gas removal filter and exit through the air outlet of the GPP treatment section. In addition, airflows of the GPP treatment section and PPP treatment section are directed by their respective blower, and a portion of the air exiting the air outlet of the PPP treatment section is directed through the air inlet of the GPP treatment section.

The PPP treatment section may include an enclosure to house the particle removal filter and the blower.

The GPP treatment section may include an enclosure to house the gas removal filter and the blower.

The speed of the blowers for PPP and GPP treatment sections may be pre-programmed and adjusted to work at optimum speeds.

At least one gas phase sensor and at least one particle phase sensor may be included.

The speed of the blowers for the GPP and PPP treatment sections may be controlled by at least one central processing unit, the central processing unit determining the speed based on the concentrations of the gas phase pollutants and particle phase pollutants detected in the air, and the central processing unit may be installed within the system or remote from the system by another air monitoring device.

The gas removal filter may be completely filled and tightly packed with material for gas phase pollutant adsorption and/or absorption.

The material may be any one from the group consisting of: molecular sieves, zeolite, metals oxides, zeolitic complementary materials, activated carbon, and any combined of them.

The gas removal filter may be a combination of a gas removal filter with low filter air flow resistance and a pre-filter with high air flow resistance.

The gas removal filter with low filter air flow resistance may be a catalyst filter containing photocatalyst material coated on the surface substrate and is irradiated by a UV sterilizer for gas phase pollutant decomposition.

The pre-filter with high air flow resistance may be a high efficiency particulate filter.

A pre-filter for fine dust particles at an upstream position of the gas removal filter may be included.

The pre-filter for fine dust particle filter may be a high efficiency particulate filter or other pre-filter that filters the fine dust particles which is unable to be handled by the PPP treatment section.

At least one reactive oxygen species generation device at an upstream position of the gas removal filter in the GPP treatment section may be included.

The reactive oxygen species generation devices may be any one of the combination of: ionizer, ozone generation, UV sterilizer, a device which generates hydroxyl radical, or a device which generates oxidants.

The PPP Treatment section may be arranged in any one of the following configurations:

i) a particle removal filter where the filter air flow resistance is low and the blower installed either at an upstream position or a downstream position of the particle removal filter in the PPP treatment section;

ii) a particle removal filter where the filter air flow resistance is high is installed and the blower is installed at a downstream position of the particle removal filter in the PPP treatment section; and iii) the combination of different particle removal filters are installed where a particle filter has a high filter air flow resistance and the blower is installed in a downstream position of the particle removal filter in the PPP treatment section.

The air outlets of the PPP and GPP treatment sections may re-enter to the air inlet of the PPP treatment section for repeat treatment.

The present invention enables the treatment of particle phase pollutants and gas phase pollutants in air to be completed effectively, intelligently and environmentally friendly. The traditional problem of the easy contamination of the gas removal filter due to the accumulation of unfiltered dust particles is addressed. Apart from extending the life of the gas removal filter, the performance and removal efficiencies of both gas phase and particle phase pollutants are also enhanced. This is because the positions of blowers are installed specifically based on the characteristics of the air flow resistance of the filter. Moreover, subjected to the specific filter air flow resistances and the pollutant levels, the air flow rates across the gas removal filter and the particle removal filter are adjusted so as to achieve their optimum rates without interfering each other.

An innovative, intelligent, environmental method and apparatus of air purification system is provided by the invention. The main features are: the Gas Phase Pollutants (GPP) treatment section and the Particle Phase Pollutant (PPP) treatment section. The GPP treatment section is installed at a downstream position from the particle removal filter of the PPP treatment section. The PPP treatment section includes at an air inlet and an air outlet. Partial, but not the whole or all, of the air exiting from the air outlet via the particle removal filter of the PPP treatment section enters the air inlet for the GPP treatment section.

Both the PPP and GPP treatment sections have blowers at blowing at specific rates. The blowers are installed at specific location subjected to the air flow resistance levels of the filters and concentration of the pollutants. The effectiveness of treating both the particle phase pollutants the gas phase pollutants are therefore enhanced and optimized.

Where there is a high dust level, the blower for GPP treatment section may be slowed or turned off. The gas removal filter is therefore protected from contamination and hence the life of the gas removal filter is extended. The present invention minimises the need for frequent replacement of the gas removal filter. The increased effectiveness and extended life of the filter results in system size reduction and enables the system to be used in a small size air purification system.

A method for air purification is provided which comprises the use of a Particle Phase Pollutant (PPP) treatment section and a Gas Phase Pollutants (GPP) treatment section. The PPP treatment section is built with a particulate filter which is specifically designed for particle phase pollutant removal. The PPP treatment section contains a blower, an air inlet and an air outlet. The particulate filter is any one of or the combination of: HEPA, Electrostatic Precipitator and ionizer. The air is drawn into the PPP treatment section by a blower via the air inlet, and subsequently through the particulate filter and exits through the outlet.

At a downstream position of the particle removal filter of the PPP treatment section, the GPP treatment section removes the gas phase pollutants. Partial, but not the whole and all, of the air exiting from the air outlet via the particle removal filter of the PPP treatment section enters the air inlet for the GPP treatment section. All, and or partial air exit from both or any of the air outlets for PPP and GPP treatment sections re-enter to the air inlet of the PPP treatment sections for repeat treatment processes.

The GPP treatment section has a blower at a downstream position and a gas removal filter with high filter air flow resistance. The gas removal filter is completely filled, tightly packed with material for gas phase pollutants adsorption. The material can include molecular sieves, zeolite, metal oxides, zeolitic complementary materials, activated carbon, or a combination of these materials. To facilitate further catalytic reaction, a reactive oxygen species generation device may also be included at an upstream position of the gas removal filter in the GPP treatment section. The reactive oxygen species generation devices is any or the combination of ionizer, ozone generation, UV sterilizer, a device which generates hydroxyl radicals, and/or a device which generates oxidants.

The gas removal filter with high filter air flow resistance can be a combination of (i) a gas removal filter with low filter air flow resistance and (ii) a pre-filter with high air flow resistance. The gas removal filter with low filter air flow resistance can be a catalyst filter containing photocatalyst material coated on the surface of a substrate and irradiated by a UV sterilizer for gas phase pollutant decomposition. The pre-filter with high air flow resistance can be a high efficiency particulate filter. To facilitate further catalytic reaction, a reactive oxygen species generation device may be included at an upstream position of the gas removal filter in the GPP treatment section. The reactive oxygen species generation device is any or the combination of an ionizer, an ozone generator, a UV sterilizer, a device which generates hydroxyl radical, and/or a device which generates oxidants.

The speed of the blower is adjusted in response to the air flow resistance of the particulate filter. The speed can be dynamically changed and automatically set at an optimum speed for particulate removal based on changes of air flow resistance of the filter and detected dust concentration. The speed can also be changed based on the pre-programmed setting, based on the needs of the locations where the air purification system is installed. The blowers can also be controlled by a central processing unit. The central processing unit determines the speeds of the blowers based on the concentrations of the gas phase pollutants and particle phase pollutants. The central processing unit can be installed either within a deployed air purification system or in a remote location that is controlled by another air-monitoring device.

In a number of embodiments, the airflow rate for the blower of PPP treatment section is proportional to the concentration of the dust concentration.

$$R_{ppp} \alpha [D]$$

$R_{ppp}$=airflow rate of the blower in the PPP treatment section
[D]=concentration of the particulate matter, dust or respirable suspended particulates However, the airflow rate for the blower of GPP treatment section is not always the same case as that for PPP treatment section. If the airflow rate is too high, the residence time for the gases pollutants to stay in the gas removal filter would become too short, and hence more difficult for them to be retained and adsorbed or absorbed on the catalyst surface or get into the pores of the catalyst for further chemical reaction.

The speed of a blower in the GPP treatment section can be tailored to certain values, based on practical testing, including but limited to different types and thicknesses of adsorption or catalyst filters, the types and rates of the chemical reaction, and/or concentration of gas phase pollutants.

In several embodiments, blowers are installed in specific locations to maintain the air purification system operating at an optimum performance.

In the PPP treatment section, the position of the blower is installed based on the air flow resistance of the particle removal filter.
  (i) If a particle removal filter having low air flow resistance is installed, the blower shall be installed either at an upstream position or a downstream position of the particle removal filter in the PPP treatment section.
  (ii) If a particle removal filter having a high air flow resistance is installed, the blower shall be installed in the downstream position of the particle removal filter in the PPP treatment section.
  (iii) If a combination of different particle removal filters is installed so that the particle filter has a high filter air flow resistance, the blower can be installed in the downstream position of the particle removal filter in the PPP treatment section.

BRIEF DESCRIPTION OF THE DRAWINGS

An example of the invention will now be described with reference to the accompanying drawings, in which.

DETAILED DESCRIPTION OF THE DRAWINGS

Figure 3:
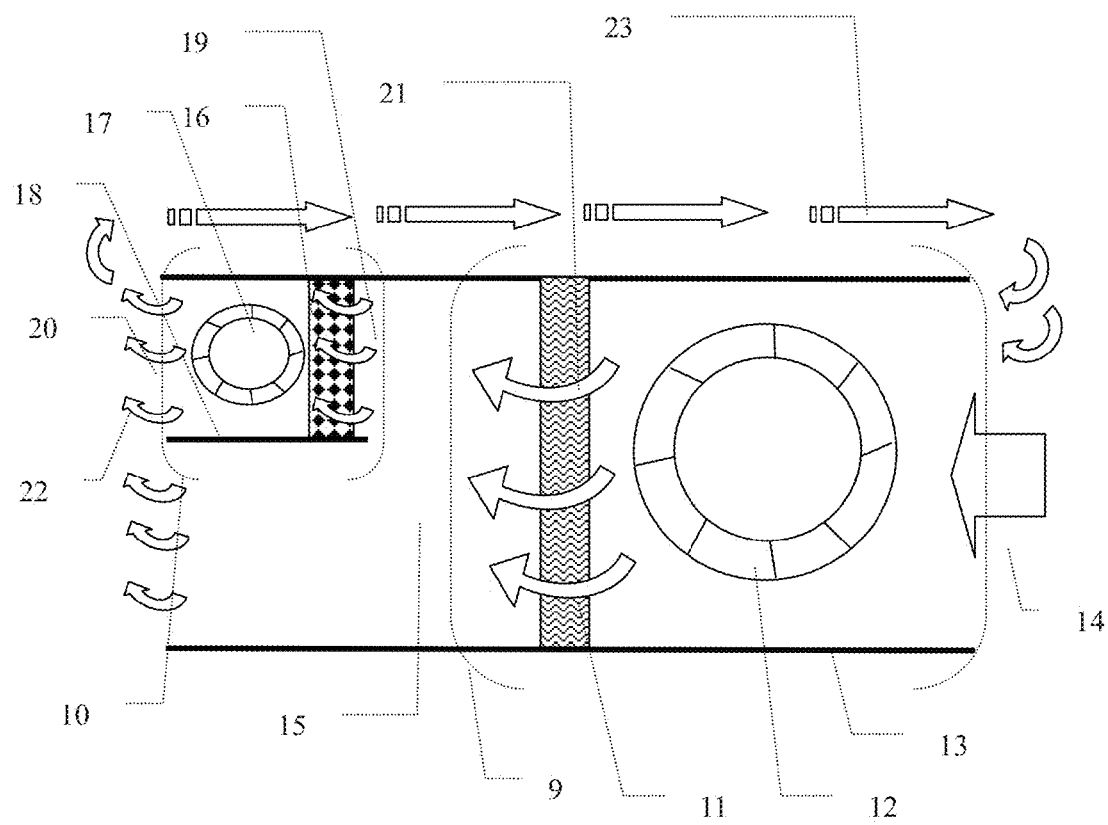
FIG. 3 is a schematic diagram of the present invention according to a first embodiment.

Referring to FIG. 3, there is illustrated a first embodiment of the present invention. An air purification system is provided. The system generally comprises: a Particle Phase Pollutant (PPP) treatment section 9 and a Gas Phase Pollutant (GPP) treatment section 10. The Particle Phase Pollutant (PPP) treatment section 9 includes: an air inlet 14 and an air outlet 15, a particle removal filter 11 and a blower 12. The Gas Phase Pollutant (GPP) treatment section 10 is installed at a downstream position of the particle removal filter 11 of the PPP treatment section 9. The GPP treatment section includes: an air inlet 19 and an air outlet 20, a gas removal filter 16 with high filter air flow resistance; and a blower 17 located at a downstream position of the gas removal filter 16 and to draw air from the air inlet 19, passing through the gas removal filter 16 to the air outlet 20. Airflows of the GPP treatment section 9 and PPP treatment section 10 are directed by their respective blower 12, 17. A portion of the air outlet 15 of the PPP treatment section 9 serves as an air inlet 19 for the GPP treatment section 10. No air may be drawn into the GPP treatment section 10 without passing through the gas removal filter 16 within the GPP treatment section 10.

The gas removal filter 16 is completely filled and tightly packed with material for gas phase pollutant adsorption. This material consists of materials from molecular sieves, zeolite, metals oxides, zeolitic complementary materials, activated carbon, or the combined of them.

Some or all of the air exiting from the air outlets 15, 20 of the PPP and GPP treatment sections 9, 10 may re-enter into the air inlet 14 of the PPP treatment section 9 for repeat treatment.

Figure 4:
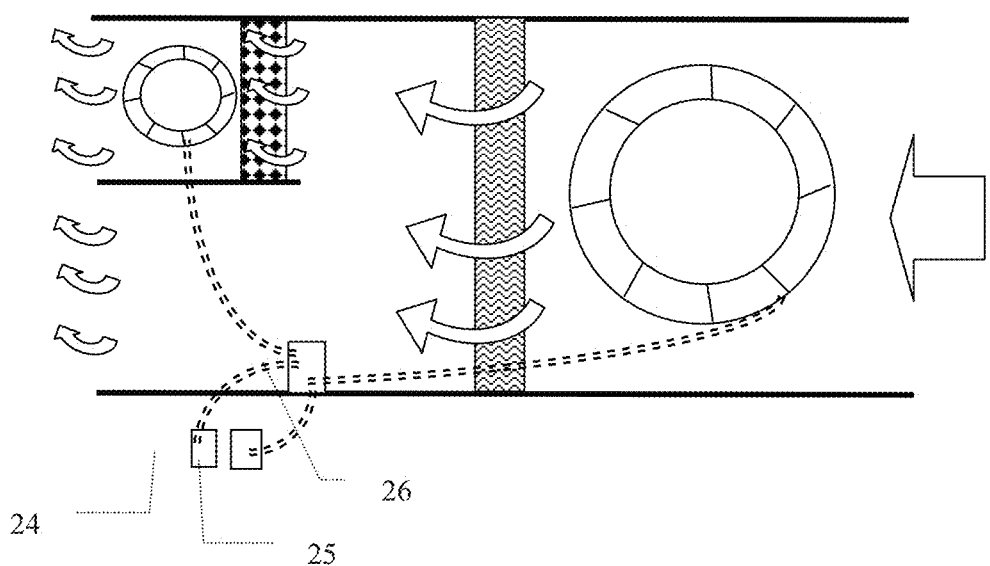
FIG. 4 is a schematic diagram of the present invention according to a second embodiment.

Referring to FIG. 4 a second embodiment is illustrated. The air purification system is similar to FIG. 1 and includes a gas phase sensor 24 and a particle phase sensor 25. The speed of the blowers for the GPP and PPP treatment sections 9, 10 are controlled by a central processing unit 26. The central processing unit 26 determines the speeds based on the concentrations of the gas phase pollutants and particle phase pollutants.

Figure 5:
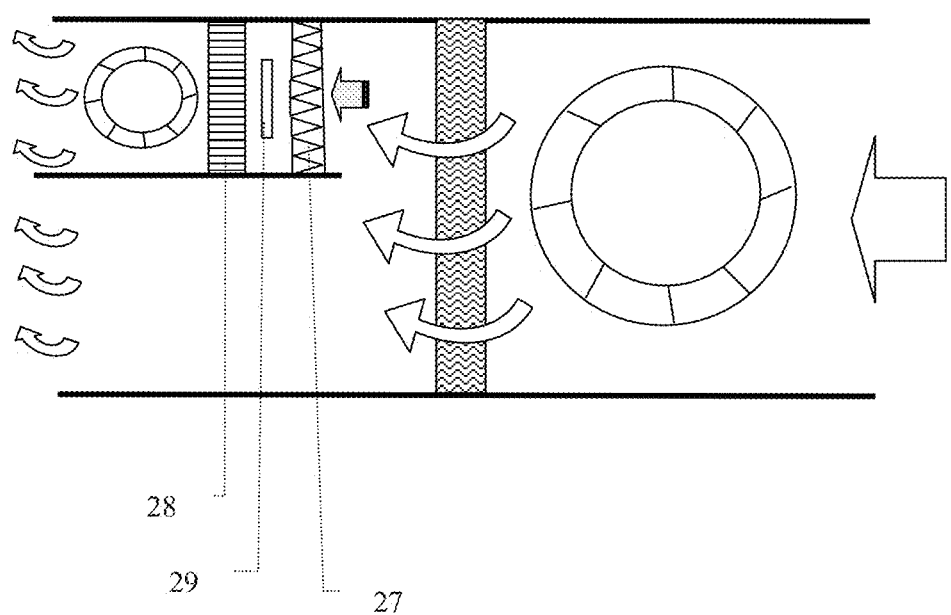
FIG. 5 is a schematic diagram of the present invention according to a third embodiment.

Referring to FIG. 5 a third embodiment is illustrated. The gas removal filter with high filter air flow resistance is the combination of: a gas removal filter 28 with low filter air flow resistance and a pre-filter 27 with high air flow resistance. The gas removal filter 28 is a catalyst filter containing a photocatalyst material coated on the surface substrate and is irradiated by a UV sterilizer 29 for gas phase pollutant decomposition.

Figure 6:
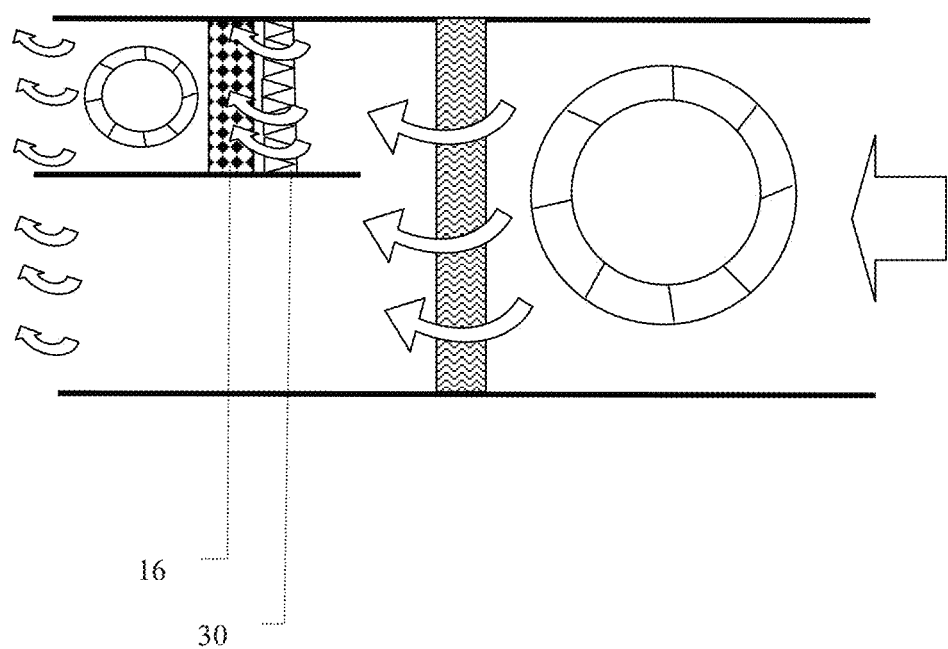
FIG. 6 is a schematic diagram of the present invention according to a fourth embodiment.

Referring to FIG. 6 a fourth embodiment is illustrated. A pre-filter 30 for fine dust particle is included at an upstream position of the gas removal filter 16 similar to FIG. 1. The pre-filter 30 for fine dust particle filter may be a high efficiency particulate filter or other pre-filter that filters the fine dust particles which cannot be handled by the PPP treatment section 9.

Figure 7:
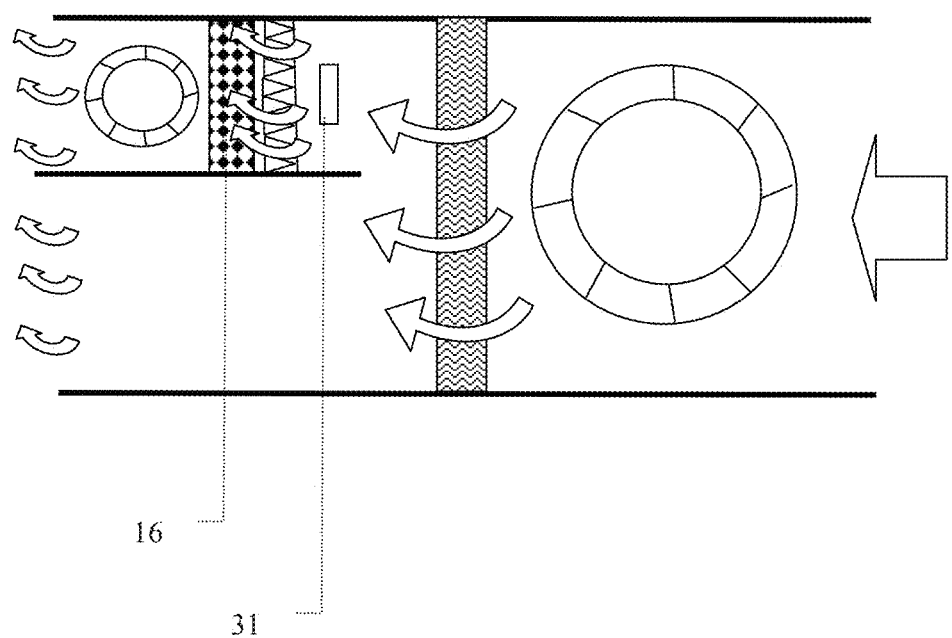
FIG. 7 is a schematic diagram of the present invention according to a fifth embodiment.

Referring to FIG. 7, a fifth embodiment is illustrated. A reactive oxygen species generation device 31 is provided at an upstream position of the gas removal filter 16 in the GPP treatment section 10 similar to FIG. 1. The reactive oxygen species generation device 31 is any from the group consisting of: an ionizer, an ozone generator, a UV sterilizer, a device which generates hydroxyl radical, and a device which generates oxidants.

Figure 8:
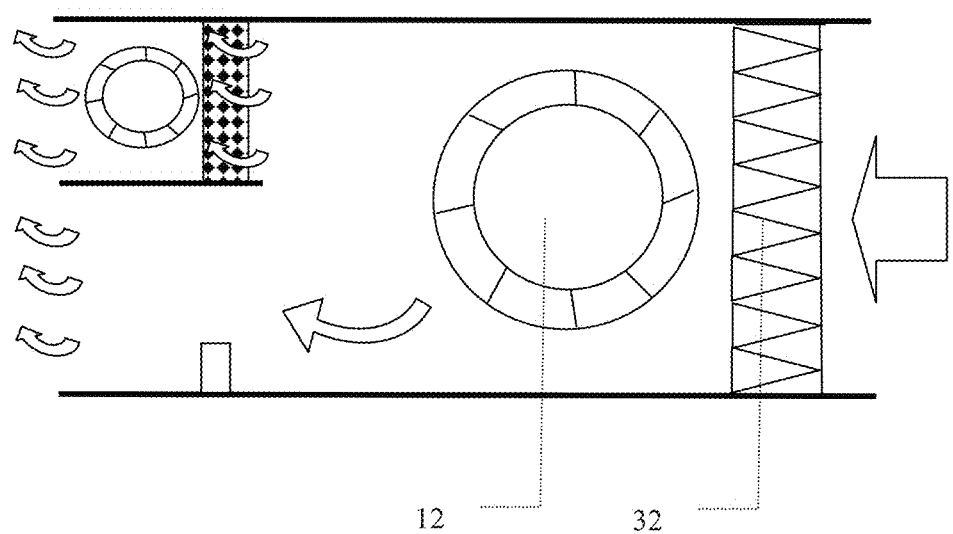
FIG. 8 is a schematic diagram of the present invention according to a sixth embodiment.

Referring to FIG. 8, a sixth embodiment is illustrated. There is provided a particle removal filter 32 with high air flow resistance. The blower 12 is installed at a downstream position of the particle removal filter 32 in the PPP treatment section 9.

Figure 9:
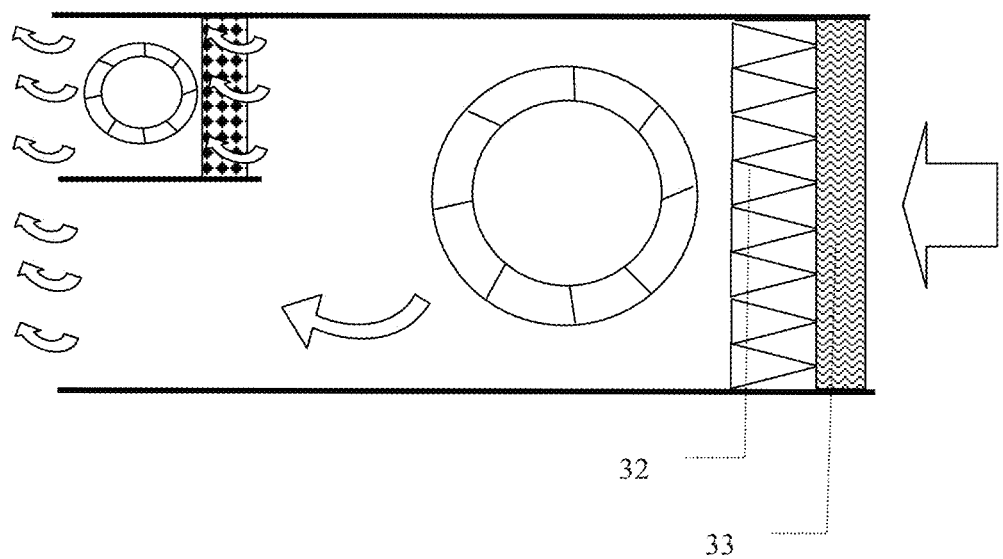
FIG. 9 is a schematic diagram of the present invention according to a seventh embodiment.

Referring to FIG. 9, a seventh embodiment is illustrated. The combination of filter 32 with high filter air flow resistance and filter 33 with low filter air flow resistance for particle removal filters 32 is provided. The blower 12 is installed at a downstream position of the particle removal filters 32 in the PPP treatment section 9.

Figure 10:
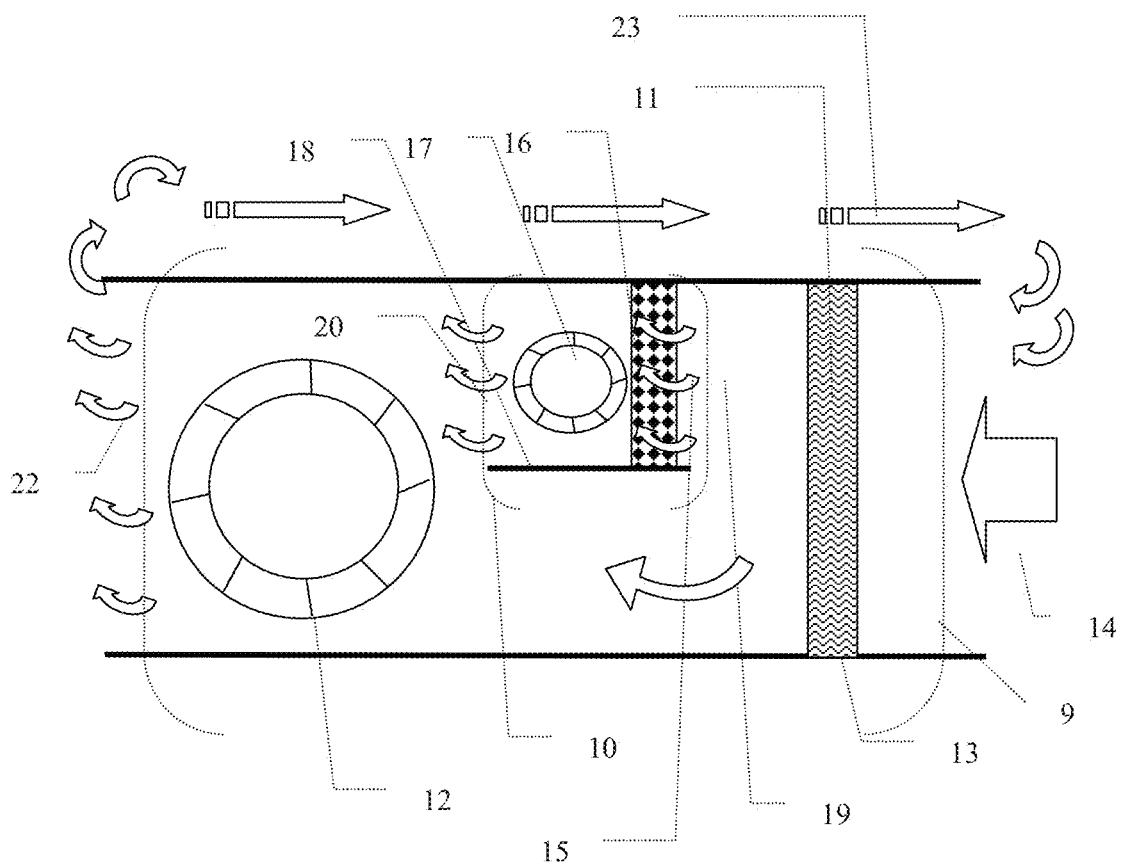
FIG. 10 is a schematic diagram of the present invention according to an eighth embodiment.

Referring to FIG. 10, an eighth embodiment is illustrated. The system generally includes: a Particle Phase Pollutants (PPP) treatment section 9 and a Gas Phase Pollutants (GPP) treatment section 10. The Particle Phase Pollutants (PPP) treatment section 9 includes: an air inlet 14 and an air outlet 15, a particle removal filter 11 and a blower 12. The GPP treatment section 10 is installed at a downstream position of the particle removal filter 11 of the PPP treatment section 9. The GPP treatment section 10 includes: an air inlet 19 and an air outlet 20, a gas removal filter 16 with high filter air flow resistance; and a blower 17 located at a downstream position of the gas removal filter 16 and to draw air from the air inlet 19, passing through the gas removal filter 16 to the air outlet 20. Airflows of the GPP treatment section 9 and PPP treatment section 10 are directed by their respective blower 12, 17. A portion of the air exiting the air outlet 15 via the particle removal filter 11 of the PPP treatment section 9 enters the air inlet 19 of the GPP treatment section 10. No air may be drawn into the GPP treatment section 10 without passing through the gas removal filter 16 within the GPP treatment section 10. In this embodiment, the enclosure 18 of GPP treatment section 10 is built within the enclosure 13 of the PPP treatment section 9, downstream of the dust removal filter 11.

Figure 1:
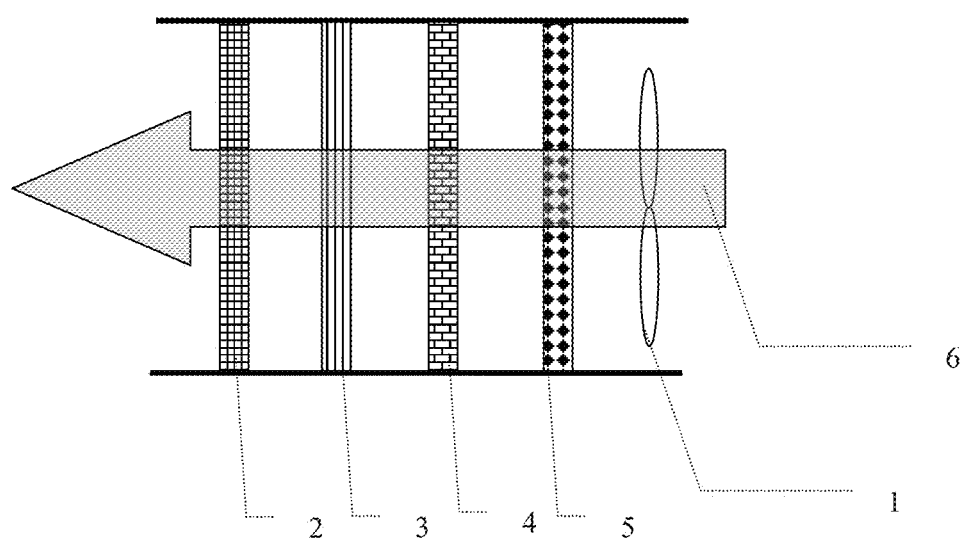
FIG. 1 is a schematic diagram of a prior art air purification system.
Figure 11:
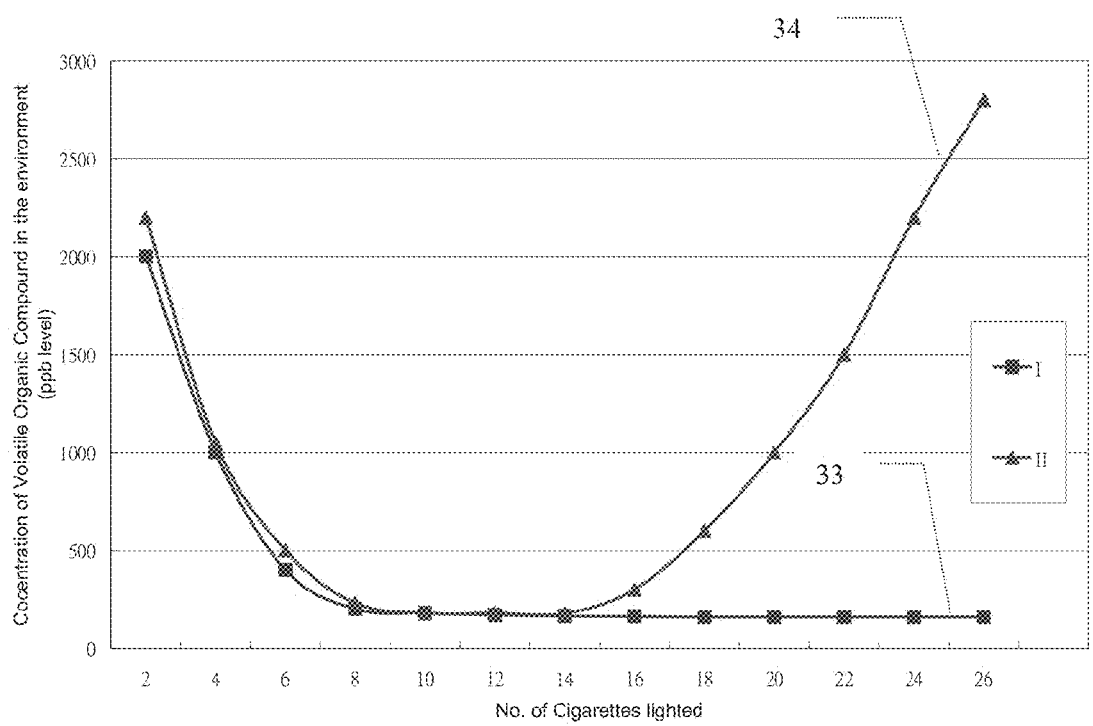
FIG. 11 is a chart showing a comparison of the filter life of a gas removal filter using (I) the first embodiment of the present invention and (II) the prior art air purification system shown in FIG. 1.

Referring to FIG. 11, a chart comparison on filter life of the gas removal filter 16 of the first embodiment (curve I 33) against the prior art air purification system of FIG. 1 (curve II 34) is illustrated. The comparison was carried out in a controlled environment where twenty cigarettes were lit at regular time intervals. The lit cigarettes contain both gas phase pollutants and particle phase pollutants. The concentration of gas phase pollutants is measured with a Volatile Organic Compound. As shown by curve II 34, the gas phase pollutants are effectively removed only at the early stage. As no particle filter is able to completely remove the particulate matter, the un-removed particulate matter falls into the second, third, fourth layers etc. The gas removal adsorption filters become ineffective in the later stage of curve II 34 because the adsorption surface is clogged by the un-removed particulate matter. The result of curve I 33 indicates that the first embodiment is able to extend the life of the filter and that optimal performance is maintained until the end of the experiment.

Figure 12A:
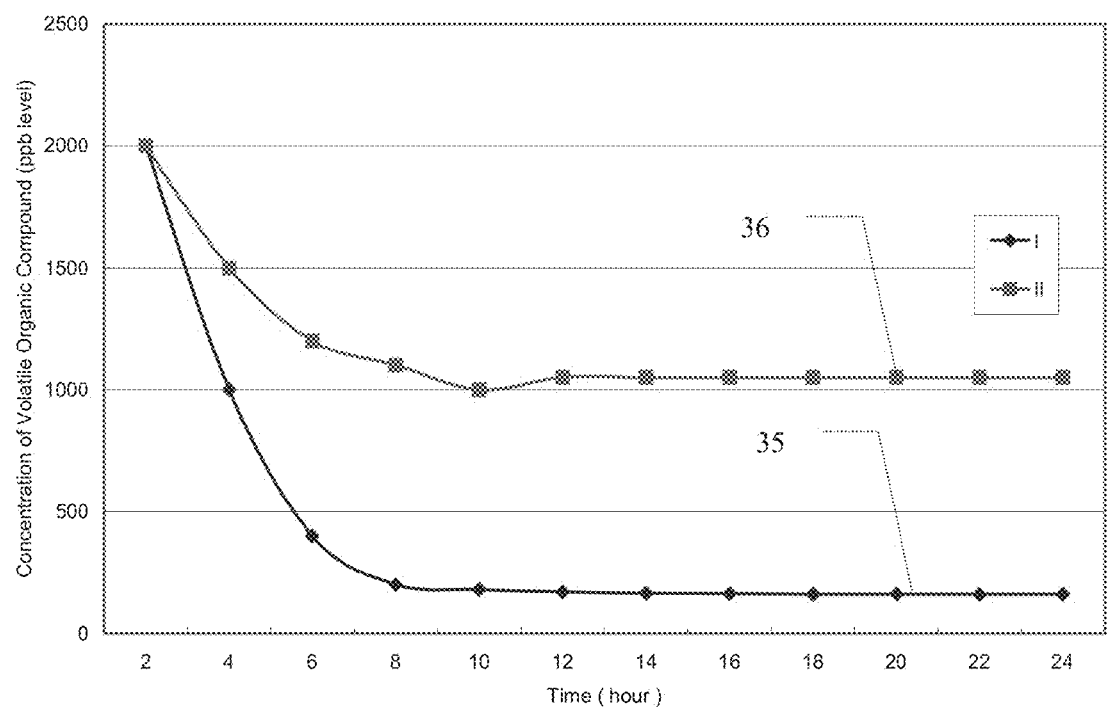
FIG. 12a is a chart showing a comparison of the removal efficiency of gas phase pollutants using (I) the first embodiment of the present invention and (II) modified prior art air purification system shown in FIG. 2.
Figure 12B:
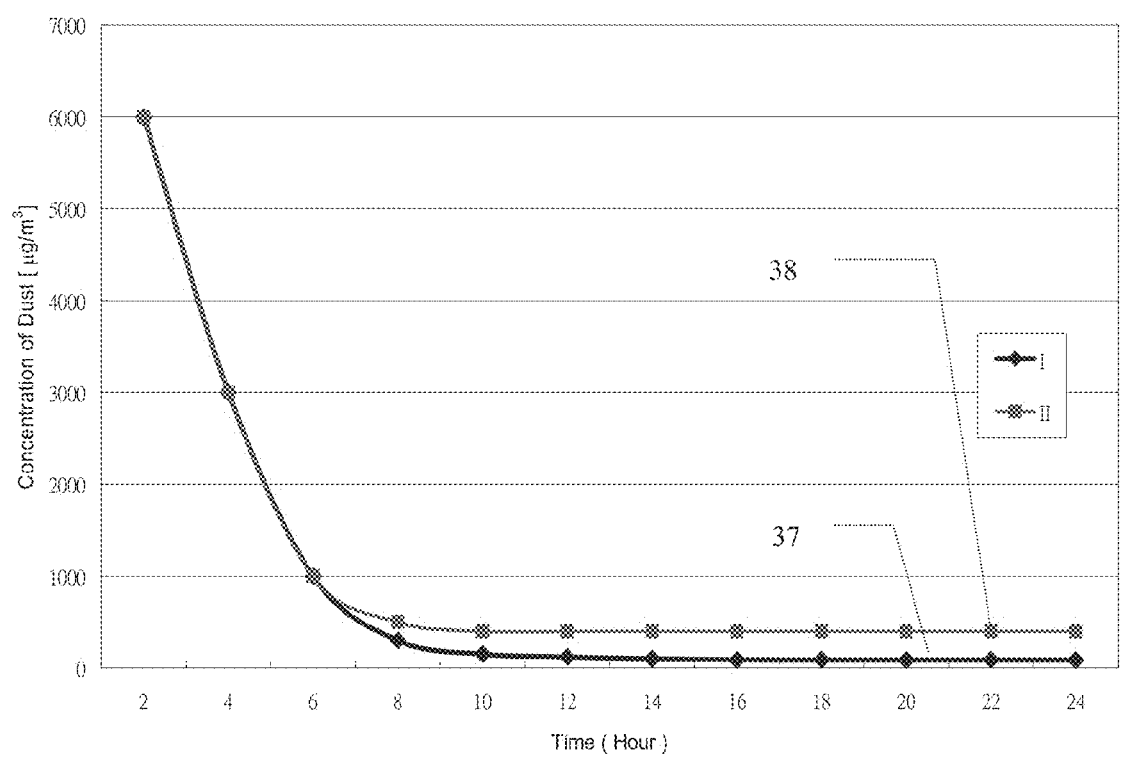
FIG. 12b is a chart showing a comparison of the removal efficiency of particle phase pollutants using (I) the first embodiment of the present invention and (II) modified prior art air purification system shown in FIG. 2.

Referring to FIGS. 12a and 12b, another experiment was carried out in a controlled environment where twenty cigarettes are lighted at the same time. The lit cigarettes contain both gas phase pollutants and particle phase pollutants. The concentration of gas phase pollutants was measured with a Volatile Organic Compound. The concentration of particle phase pollutants was measured with a dust meter.

Figure 2:
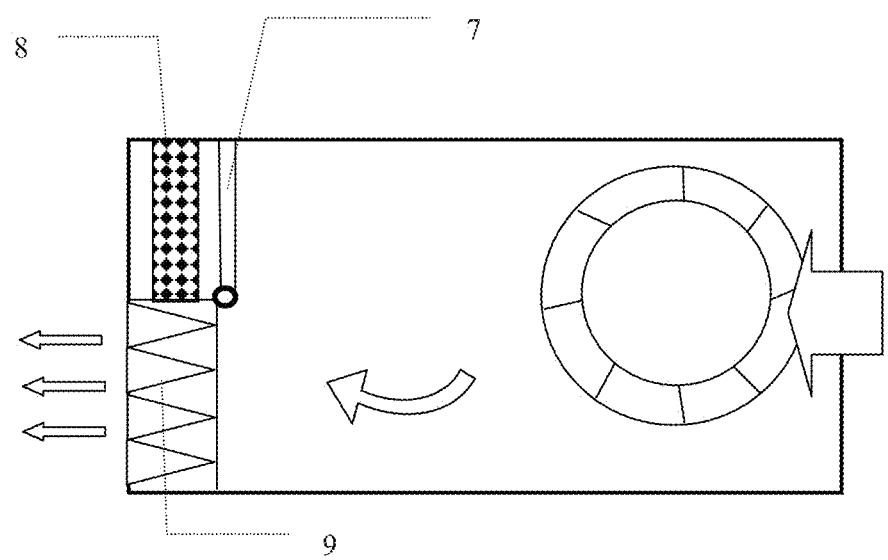
FIG. 2 is a schematic diagram of a modified prior art air purification system based on the principle disclosed in Japanese patent application 2004-74859.

FIG. 12a is a comparison of gas phase pollutant removal efficiency of the first embodiment (curve I 35) and the prior art modified air purification system of FIG. 2 (curve II 36). FIG. 12b is a comparison on the removal efficiency of particle phase pollutants of the first embodiment (curve I 37) and the prior art modified air purification system of FIG. 2 (curve II 38).

The result indicates that the prior art modified air purification system based on the principle disclosed in Japanese patent application 2004-74859 is inflexible and unable to properly treat air if the environment is polluted with high concentrations of both gas phase pollutants and particle phase pollutants. The concentration of dust 38 and the concentration of gases 37 pollutants in the environment cannot be suppressed to the lowest level because the system is unable to be optimized with only one blower.

However, the first embodiment demonstrates high efficiencies in gas phase 35 and particle phase 37 pollutant removal throughout the entire duration of the experiment.

It will be appreciated by persons skilled in the art that numerous variations and/or modifications may be made to the invention as shown in the specific embodiments without departing from the scope or spirit of the invention as broadly described. The present embodiments are, therefore, to be considered in all respects illustrative and not restrictive.

What is claimed:
1. A method of purifying air comprising:
  directing air through a particle removal filter that acts to filter the air for particle phase pollutants to thereby produce particulate filtered air;
  measuring the concentration of particle phase pollutants in the particulate filtered air; and
  directing an amount of the particulate filtered air through a gas removal filter that acts to filter the particulate filtered air for gas phase pollutants to thereby produce gas filtered air;

wherein the amount of particulate filtered air directed through the gas removal filter is based on the concentration of particle phase pollutants in the air; and wherein when particle phase pollutants are present above a threshold concentration value, the amount of particulate filtered air directed through the gas removal filter is reduced relative to when the particle phase pollutants are present below the threshold concentration value.

2. The method of purifying air of claim 1, wherein when particle phase pollutants are present above the threshold concentration value, no particulate filtered air is directed through the gas removal filter.

3. The method of purifying air of claim 1, wherein:
the air is directed through the particle removal filter using a first blower;
the particulate filtered air is directed through the gas removal filter using a second blower; and
the speed of the first blower is based on at least one of: the concentration of particle phase pollutants in the air, the air flow resistance caused by the particle removal filter, and the air flow resistance caused by the gas removal filter.

4. The method of purifying air of claim 3, further comprising:
using a central processing unit to determine the speeds of the blowers based on the concentrations of the gas phase pollutants and the particle phase pollutants.

5. The method of purifying air of claim 1, further comprising:
directing at least some of the particulate filtered air through a pre-filter that acts to remove fine particle phase pollutants;
wherein the gas filtered air has passed through the pre-filter.

6. The method of purifying air of claim 5, wherein the pre-filter acts to remove fine particle phase pollutants that could not have been removed by the particle removal filter.

7. The method of purifying air of claim 1, further comprising:
directing at least some of the particulate filtered air back through the particle removal filter; and
directing at least some of the gas filtered air back through the particle removal filter.

* * * * *